United States Patent [19]

Takubo

[11] Patent Number: 4,729,666
[45] Date of Patent: Mar. 8, 1988

[54] SCREW FOR MOLDING THERMOPLASTIC RESIN HAVING A STRESS RELAXATION SECTION

[75] Inventor: Toyokazu Takubo, Chiba, Japan

[73] Assignee: Idemitsu Petrochemical Co., Ltd., Tokyo, Japan

[21] Appl. No.: 896,902

[22] Filed: Aug. 15, 1986

[30] Foreign Application Priority Data

Aug. 16, 1985 [JP] Japan .................. 60-180846
Aug. 16, 1985 [JP] Japan .................. 60-180847

[51] Int. Cl.$^4$ .............................................. B29B 7/42
[52] U.S. Cl. ..................... 366/343; 366/88; 366/89; 366/90; 366/323; 425/208
[58] Field of Search ............... 425/200, 202, 204–209, 425/376 R, 376 B; 264/176.1, 211.21, 211.23, 349; 366/79, 88, 89, 90, 322, 323

[56] References Cited

U.S. PATENT DOCUMENTS

| | | | |
|---|---|---|---|
| 3,584,340 | 6/1971 | Koch | 425/207 |
| 4,099,897 | 7/1978 | Takano et al. | 425/208 |
| 4,107,260 | 8/1978 | Dougherty | 366/79 |
| 4,255,379 | 3/1981 | Frankland, Jr. | 425/208 |
| 4,332,932 | 6/1982 | Harada et al. | 425/208 |
| 4,666,649 | 5/1987 | Takubo et al. | 264/176.1 |

FOREIGN PATENT DOCUMENTS

| | | |
|---|---|---|
| 48093 | 5/1974 | Australia . |
| 336873 | 9/1976 | Austria . |
| 0050496 | 4/1982 | European Pat. Off. . |
| 1246223 | 8/1967 | Fed. Rep. of Germany . |
| 1778770 | 9/1971 | Fed. Rep. of Germany . |
| 1779231 | 5/1972 | Fed. Rep. of Germany . |
| 2256825 | 8/1975 | France . |
| 48-51058 | 7/1973 | Japan . |
| 50-108361 | 8/1975 | Japan . |
| 51-150571 | 12/1976 | Japan . |
| 58-57932 | 4/1983 | Japan . |
| 61-144324 | 7/1986 | Japan . |
| 1171590 | 11/1969 | United Kingdom . |
| 1485500 | 9/1977 | United Kingdom . |

OTHER PUBLICATIONS

Fisher, E. G., *Extrusion of Plastics*, 1964, pp. 51–59.

*Primary Examiner*—Jay H. Woo
*Assistant Examiner*—J. Fortenberry
*Attorney, Agent, or Firm*—Flynn, Thiel, Boutell & Tanis

[57] ABSTRACT

This invention relates to a screw used in an equipment for molding thermoplastic resin, in which a mixing section is provided at a position adjacent a shearing section, and the pitch of a stress relaxation section is preset to the pitch, at which satisfactory kneading can be performed without giving high shearing to the resin. With this screw, even if high-speed extrusion molding is performed, the pressure of resin is not fluctuated, molded parts can avoid lowered material quality and outstanding molded parts can be provided.

17 Claims, 10 Drawing Figures

SCREW FOR MOLDING THERMOPLASTIC RESIN HAVING A STRESS RELAXATION SECTION

BACKGROUND OF THE INVENTION

1. Field of the Invention

This invention relates to a screw for molding thermoplastic resin, used in an extrusion equipment.

2. Description of the Prior Art

Various molded parts such as a sheet, film, container are obtainable from thermoplastic resins through extrusion-, blow-, injection-molding and the like. In each of the above-described fields of molding, construction of the screw in the extrusion equipment is an important factor for performing heating, melting and kneading of the resin.

Figure 1:
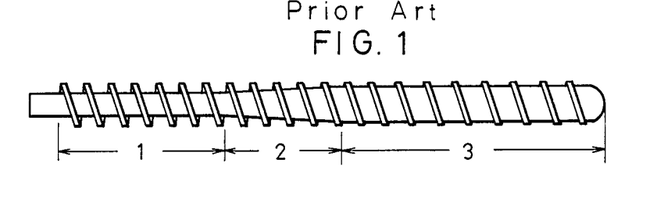
FIG. 1 is a side view showing the conventional common screw.

The conventional most common screw having its main object to satisfactorily perform kneading of a molten resin by increasing a compression ratio is typified by a full flight metering screw successively provided from a resin feed side to a resin extrusion side with a feed section 1, compression section 2 and metering section 3 as shown in FIG. 1, for example. As a consequence, although kneading of the resin is carried out satisfactorily, the compression ratio is high and high shearing is accompanied, thus presenting some disadvantages. More specifically, when the compression ratio is high and high shearing is accompanied, pressure of a resin tends to fluctuate during high-speed extrusion molding, so that molded parts of high quality cannot be consistently obtained. Furthermore, satisfactory kneading during the high-speed extrusion molding leads to that the resin in the proximity of the forward end portion of the screw is subjected to high shear stress, this high shear stress brings about mechanical heating to raise the temperature of the resin beyond necessity, making the resin low in density, the resin is deteriorated in material quality to lower the physical properties of the molded parts. It becomes difficult in takeup and sizing during extrusion molding and driveling tends to occur during injection molding.

Furthermore, during high-speed extrusion molding, a large driving force is required for driving the screw, and this driving force causes the temperature of the resin to rise. As a consequence, in order to prevent the overheat of this driving energy, and further, the overheat of the temperature of the resin, it becomes necessary to cool the heating from outside, whereby a great problem is presented from the viewpoint of energy saving and the viewpoint of requiring equipment for cooling, so that solution of this problem is demanded.

Particularly, these problems are highly true of the case of thermoplastic resins such as polypropylene, linear low density polyethylene, polycarbonate and polystyrene out of various thermoplastic resins, said thermoplastic resins showing newtonian shear properties (properties showing relatively high melt viscosity under a high rate of shear) caused by such a factor that the molecular-weight distribution thereof is relatively narrow.

As a result, there have been proposed various screws each having a construction wherein the compression ratio is made relatively small, which is made less than 1 to control generation of shearing heat as the case may be. However, in each of these cases, kneading becomes unsatisfactory, whereby temperature of the resin is ununiformized and diffusion of various additives becomes unsatisfactory, so that it is difficult to obtain satisfactory molded parts and the scope of utilization thereof is limited. Furthermore, as one to improve the above-described respects, there has been proposed a construction of two stage screws. However, stress relaxation is not satisfactory, whereby molded parts excellent in surface characteristics and transparence are not obtainable.

Now, to obviate the disadvantages of the prior art, the present applicant has proposed a novel technique wherein a compression section of a screw is turned into a relaxed compression section having a relatively small compression ratio (Japanese Patent Application No. 266398/1984), and the present invention has the same object as described above and has further improved the aforesaid invention.

SUMMARY OF THE INVENTION

The present invention has as its object the provision of a construction of a screw, wherein satisfactory kneading properties and high molding stability, which would have otherwise been difficult to be compatible, are made compatible.

To this end, a first aspect of the present invention contemplates that a feed section, a compression section, a shearing section and a stress relaxation section are successively provided from a resin feed side to a resin extrusion side, and a mixing section is provided at least at either one side of the resin feed and the resin extrusion sides of the shearing section, so that satisfactory kneading can be carried out, while accumulation of shear stress is controlled.

To achieve the above-described object better, a second aspect of the present invention contemplates that a feed section, a compression section, a shearing section and a stress relaxation section are successively provided from a resin feed side to a resin extrusion side, at least part of the pitch of the stress relaxation section is made 0.3-0.8 times the pitch of the principal portion of the screw as a whole, e.g. the pitch of the feed section or the compression section, whereby a dwell time for the resin in the stress relaxation section is prolonged to obtain satisfactory stress relaxation.

DETAILED DESCRIPTION OF THE PREFERRED EMBODIMENT

The present invention will hereunder be described in detail with reference to the accompanying drawings.

First, the thermoplastic resin used in the present invention need not necessarily be limited to the particular ones, and, for example, there may be exemplified high density polyethylene, high-pressure produced low density polyethylene, linear low density polyethylene, copolymer of polypropylene, ethylene or propylene with other α-olefin, polystylene, polyamide, polyester, polycarbonate, polyvinyl chloride, polyacrylonitrile, polyvinylidene chloride, polyphenylene oxide, polyamide, polysulfone, polyphenylene sulfide, polyketone. Among all, the thermoplastic resins are preferably used in the case of ones such as polypropylene, linear low density polyethylene, polycarbonate and polystylene, said thermoplastic resins showing newtonian shear properties (properties showing relatively high melt viscosity under a high rate of shear) caused by such a factor that the molecular-weight distribution thereof are relatively narrow. The reason is that these resins are high in viscosity in the high shear area of an extrusion machine, whereby a screw power consumption rate is high for extruding the resin of this high viscosity, so that the extrusion productivity becomes low to raise the manufacturing cost. Due to the rise in temperature of the resin caused by the shearing heat, there are possibilities of deteriorated resins, deteriorated and decomposed additives.

As the resins under study to be improved in transparence, luster and the like of extruded molten resins out of the resins used in the present invention, there are polypropylene, random polypropylene, in which α-olefin such as ethylene of 20 wt % or less is copolymerized, linear low density polyethylene and the like. It has heretofore been very difficult to produce a molded sheet and film excellent in transparence, due to crystallization thereof.

Figure 2:
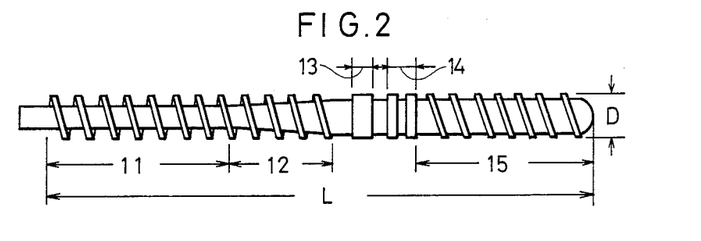
FIGS. 2 to 4 are side views showing the screws for molding thermoplastic resin according to the first aspect of the present invention, which are different from one another.

FIG. 2 shows one embodiment of the screw for molding the thermoplastic resin according to the first aspect of the present invention, in which drawing a feed section 11, a compression section 12, a shearing section 13, a mixing section 14 and a stress relaxing section 15 are successively provided from a resin feed side to a resin extrusion side.

Resin pallets are fed to the feed section 11 from a resin feed port of a cylinder, not shown, and delivered under pressure to the compression section 12 by a driving force of the screw, while the resin pellets are melted and plasticized. As the feed section 11, a straight screw having a compression ratio 1 is normally used. In the compression section 12, the depth of screw channel is progressively made shallow to raise the compression ratio. The compression section 12 is formed to provide a relaxed compression section having a compression ratio of 3 or less, preferably 2.5 or less. The molten resin is compressed in this section. When the compression ratio exceeds 3, the shear stress is raised in an end portion of the compression section 12, i.e. a portion before the shearing section 13, whereby rise in the resin temperature, accumulation in the shear stress, a breakup phenomenon and the like unpreferably occur. In consequence, as the type of screw used in a portion from the feed section 11 to the compression section 12, any screw may be adopted only if it is of a relaxed compression type, i.e. a screw of the type, in which the depth of screw channel is varied at an equal pitch or a screw of the type, in which the depth of the screw channel is constant while the pitch is varied. Anyway, it is preferable that, in the feed section 11 and the compression section 12, feeding and melting of the resin are performed and the resin is delivered into the succeeding stage without giving to the resin an excessively intense kneading. However, when the compression ratio is excessively low. e.g. the compression ratio becomes 1.5 or less through the feed section 11 and compression section 12, it is not preferable that an unnecessary stagnation of the resin is brought about and an satisfactory kneading in the initial stage occurs.

The shearing section 13 is comprised of a torpedo, a modification of the torpedo, in which grooves are formed on the peripheral surface in the axial direction, or a ring valve. In the shearing section 13, a resistance is given to the flow of the molten resin, so that uniform melting and kneading of the molten resin can be performed by the shearing for a relatively short period of time, A clearance formed between this shearing section 13 and the cylinder, not shown, for housing the screw is made very small, so that the shearing effect can be raised. The length of the shearing section 13 is normally 0.2-2 times the diameter of the screw, and preferably, 0.3-1.5 times thereof. The mean sectional area of the aforesaid clearance formed between the shearing section 13 and the cylinder, for example, is $\frac{1}{2}$-1/10 of the mean sectional area of the clearance of the feed section 11, and preferably, $\frac{1}{3}$-$\frac{1}{8}$ times thereof. More specifically, although the clearance between the torpedo and the cylinder wall depends on the length of the torpedo portion, the clearance may be 1/150-1/20 times the diameter of the screw, and preferably, 1/100-1/30 times thereof. However, the most suitable ones need be selected for these values depending on the types of resin, length of the section and the like. In this case, when the shearing section 13 is comprised of the torpedo, the construction thereof can be most simplified.

Subsequently, the mixing portion 14 adjacent the shearing section 13 is comprised of a single or plurality of gear wheels, a dulmage type (discontinuous shallow-groove multiple threads each having a large helix angle are formed on the circumferential surface thereof), polygonal type, fluted type (a plurality of longitudinal and parallel grooves are formed on a screw shaft), combinations of the aforesaid various types, or the like. The outer diameter of this mixing section 14 is substantially equal to the outer diameter of the shearing section 13, however, root portions are made considerably small and the clearance from the cylinder is made large. As a consequence, the driving force by the screw is not applied to the molten resin, whereby residual stress of the resin is relaxed, so that only the mixing of the molten resin is facilitated. When the mixing section 14 is provided on the resin extrusion side of the shearing section 13, the shear stress which has been relaxed in the mixing section 14, is not raised again in the shearing section 13, thus proving to be efficient in operation.

The construction of the screw in the stress relaxing section 15 has the compression ratio of 2-0.5, and preferably, 1.6-0.8. In the stress relaxing section 15, metering (regulation of the discharge flow rate) of the molten resin is performed, the shear stress still residual in the molten resin is relaxed, and further, cooling of the molten resin is made uniform. The main object is to remove the residual shear stress and such a construction is adopted that high kneading and high shearing do not occur.

The compression ratio in this specification means "(depth of screw channel at the resin flow-in end portion)/(depth of screw channel at the resin extrusion end portion)" in the respective construction portion when the pitch is constant.

In the embodiment of FIG. 2, a stress relaxation section is formed by the mixing section 14 and the stress relaxing section 15 on the resin extrusion side rather than the shearing section 13. In this case, to be accurate, a portion between the shearing section 13 and the mixing section 14 as shown is included in the stress relaxation section. In short, the stress relaxation section indicates the section where the shear stress rendered by the shearing section 13 is released or relaxed. The length of this stress relaxation section differs depending on the construction. However, the length by which the stress relaxation can be satisfactorily achieved is normally 4–15 times the diameter D of the screw.

In the extrusion equipment according to the present invention, a ratio L/D between the total length L and the diameter D of the screw is designed to be 15–40, and preferably 20–34. In use of the present invention, grooves can be formed on the inner wall (particularly, in a liner portion) of the cylinder in the axial direction thereof in the area of the feed section 11, whereby pellets can be smoothly supplied.

In an embodiment of the present invention as described above, since the shear stress of the molten resin on the resin extrusion side (the forward end side or the nozzle's side) is satisfactorily decreased, fluctuations of the resin pressure is low. Even if high-speed extrusion molding is carried out, molding excellent in uniform section accuracy can be stably carried out. As a result, high quality molded parts being homogenized, satisfactory in surface characteristics and satisfactory in transparence depending on the types of the resin can be obtained stably.

Moreover, since kneading itself is satisfactorily carried out, the additive is diffused uniformly. From this respect, homogeneous molded parts are easily obtainable. The reason why the high-speed extrusion molding is possible resides in that, since the shearing heat is controlled, deterioration of the resin uneasily occurs, the resin temperature is low and uniformized and cooling means for preventing overheat can be dispensed with, thus proving to be suitable for energy saving.

Figure 3:
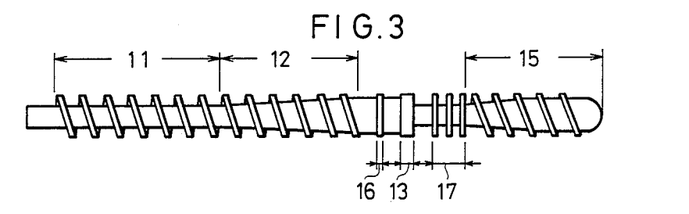

FIG. 3 shows a second embodiment of the screw for molding the thermoplastic resin according to the first aspect of the present invention. In this embodiment, mixing sections 16 and 17 are provided on opposite sides of the shearing section 13, respectively. The length of the mixing sections 16 and 17 in the axial direction of the screw is determined such that, for example, the length of the mixing section 17 on the resin extrusion side is two to several times the length of the mixing section 16 on the resin feed side, whereby mixing is preliminarily facilitated in the mixing section 16 and, in the mixing section 17, mixing is further satisfactorily carried out.

Figure 4:
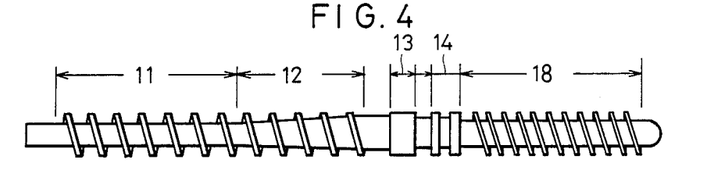

FIG. 4 shows a third embodiment of the screw for molding the thermoplastic resin according to the first aspect of the present invention. In this embodiment, the stress relaxing section 18 has the multiple thread construction. Furthermore, not shown though, the stress relaxing section 15 and 18 may be partially provided with non-threaded portions, and may be added at about the forward end portions thereof with mixing sections. The present invention includes various modifications such as the compression section 12 which may be added thereto with multiple threaded portion.

EXAMPLES AND COMPARATIVE EXAMPLES

TABLE 2 shows the results of extrusion moldings carried out under various conditions by use of a screw A according to the present invention and a screw B other than the one according to the present invention as shown in Table 1. Used polypropylene resin is Idemitsu polypropylene, F700N, MI (Melt Index) 7 g/10 min, manufactured by Idemitsu Petrochemical Co., Ltd. Used polycarbonate resin is Idemitsu polycarbonate, A3000, molecular weight 2900, manufactured by Idemitsu Petrochemical Co., Ltd.

TABLE 1

| | FEED SECTION | | COMPRESSION SECTION | | SHEARING SECTION (TORPERD) | | MIXING SECTION (GEAR WHEEL 15 CRESTS)** | | STRESS RELAXING SECTION | |
|---|---|---|---|---|---|---|---|---|---|---|
| | LENGTH | DEPTH OF SCREW CHANNEL | LENGTH | DEPTH OF SCREW CHANNEL | LENGTH | CLEARANCE | LENGTH | CLEARANCE | LENGTH | DEPTH OF SCREW CHANNEL |
| A* | 450 mm | 8 mm CONSTANT | 400 mm | 8→4 mm | 25 mm | 1 mm | 18 mm × 3 | 1 mm | 350 mm | 4 mm |
| B* | 450 mm | 8 mm CONSTANT | 500 mm | 8→2.3 mm | — | — | — | — | 350 mm | 2.3 mm |

Figure 5:
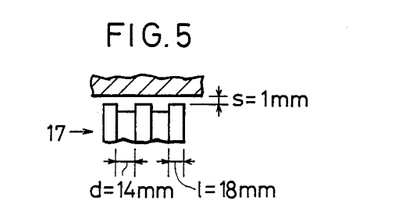
FIG. 5 is an enlarged side view partially showing an example of the mixing section.

*Both the screws A and B have L/D = 26, D = 50 mm and pitch 50 mm.
*In the mixing section of the screw A, three gear wheels each having a length l (18 mm) in the axial direction of the screw and 15 crests are formed with a distance d (14 mm) (Refer to FIG. 5). The clearance S from the inner wall of the cylinder is 1 mm.mm.

TABLE 2

| | RESIN | SCREW | PRESET CYLINDER TEMPERATURE (°C.) | ROTATION SPEED (r.p.m.) | EXTRUSION FLOW RATE (Kg/h) | SPECIFIC ENERGY (KW·h/Kg) | RESIN TEMPERATURE (°C.) | RESIN PRESSURE AT FORWARD END OF SCREW (Kg/cm²) |
|---|---|---|---|---|---|---|---|---|
| EXAMPLE 1 | POLYPROPYLENE | A | 240 | 155 | 41.1 | 0.208 | 241 | 57.7 ± 0.7 |
| EXAMPLE 2 | POLYPROPYLENE | A | 240 | 195 | 48.0 | 0.243 | 244 | 59.5 ± 1.5 |
| COMPARATIVE EXAMPLE 1 | POLYPROPYLENE | B | 240 | 104 | 31.1 | 0.197 | 240 (FLUCTUATIONS) | 166.5 ± 3.5 |
| COMPARATIVE EXAMPLE 2 | POLYPROPYLENE | B | 240 | 156 | 47.0 | 0.223 | 239 (FLUCTUATIONS HIGH) | 177 ± 21.0 |

TABLE 2-continued

|  | RESIN | SCREW | PRESET CYLINDER TEMPERATURE (°C.) | ROTATION SPEED (r.p.m.) | EXTRUSION FLOW RATE (Kg/h) | SPECIFIC ENERGY (KW · h/Kg) | RESIN TEMPERATURE (°C.) | RESIN PRESSURE AT FORWARD END OF SCREW (Kg/cm²) |
|---|---|---|---|---|---|---|---|---|
| EXAMPLE 3 | POLYCARBONATE | A | 295 | 30 | 21.6 | 0.268 | 277 | 150 ± 2.7 |
| EXAMPLE 4 | POLYCARBONATE | A | 295 | 42 | 31.6 | 0.258 | 288 | 136 ± 1.5 |
| COMPARATIVE EXAMPLE 3 | POLYCARBONATE | B | 295 | 40 | 21.0 | 0.365 | 276 | 101 ± 12.0 |
| COMPARATIVE EXAMPLE 4 | POLYCARBONATE | B | 295 | 60 | 33.4 | 0.337 | 303 | 128 ± 18.0 |
| EXAMPLE 5 | POLYCARBONATE | A | 300 | 60 | 48.6 | 0.208 | 315 | 122 ± 2.2 |
| COMPARATIVE EXAMPLE 5 | POLYCARBONATE | B | 300 | 60 | 31.2 | 0.315 | 307 | 197 ± 13.0 |

As apparent from TABLE 2, when comparison is made with the case where the rotation speeds are equal to each other, the examples of the present invention is small in value of the specific energy to thereby achieve the energy saving as compared with the comparative examples. It is found that, since the resin temperature is low and uniform, no deteriorated resin occurs, and particularly, because fluctuations of the resin at the forward end of the screw are low, even if the high-speed extrusion molding is performed, molding stability is outstanding, so that high uniform section films and sheets can be manufactured.

The screw for molding the thermoplastic resin according to the second aspect of the invention of the present application will hereunder be described. Same reference numerals are used to designate the substantially same or equivalent component parts according to the first aspect of the invention, so that the detailed description may be omitted or simplified.

Figure 6:
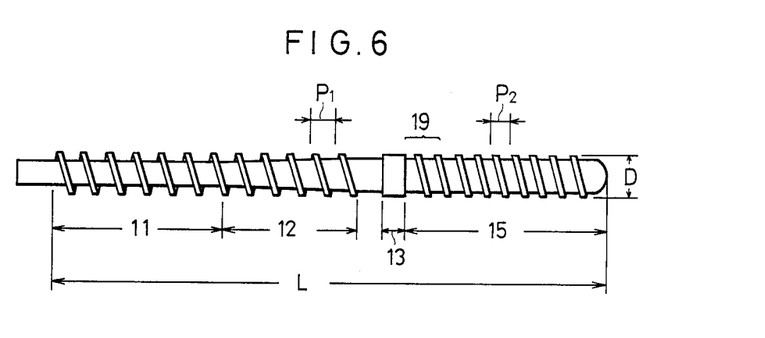
FIGS. 6 and 7 are side views showing the screws for molding thermoplastic resin according to the second aspect of the present invention, which are different from each other.

FIG. 6 shows one example of the screw for molding the thermoplastic resin according to the second aspect of the invention. In the drawing, reference numeral 19 designates a releasing section, in which the pressure applied in the shearing section 13 should be necessarily released. This releasing section 19 is the section partially constituting the stress relaxing section 15 and acting as the stress relaxation section in cooperation with the stress relaxing section 15. This releasing section 19 need not necessarily be indicated as a specific section. However, in this case, this releasing section 19 is particularly called so, because, in this releasing section 19, the resin pressure is temporarily, considerably released to thereby relax the residual shear stress for a short period of time.

The pitch in the stress relaxing section 15 is generally uniform. If the pitch is $P_2$, then $P_2=0.3-0.8P_1$. However, $P_1$ is the pitch in the main portion of the screw as a whole. For example, if the pitches in the feed section 11 and the compression section 12 are substantially similar to each other, then the pitches in these sections are $P_1$. The pitch in the stress relaxing section 15 is made small as described above, whereby a dwell time for the resin in the measuring section is prolonged to provide satisfactory stress relaxation and cooling of the molten resin is uniformized.

According to the second aspect of the invention as described above, the same effects as in the first aspect of the invention can be obtained.

Figure 7:
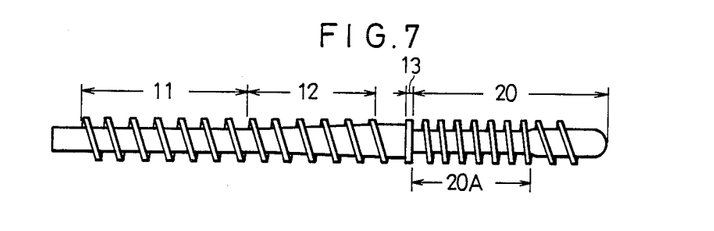

FIG. 7 shows another example of the second aspect of the invention, which only a small pitch portion 20A, which is part of the stress relaxing section 20, has the pitch of 0.3-0.8 times the pitch of the main portion of the screw as a whole, and the example shown in FIG. 7 is different from the example shown in FIG. 6 in that the portion other than the small pitch portion 20A has the same pitch as that in the main portion. With the example shown in FIG. 7, the substantially same effect as that in the first example of FIG. 6 can be achieved.

Figure 8:
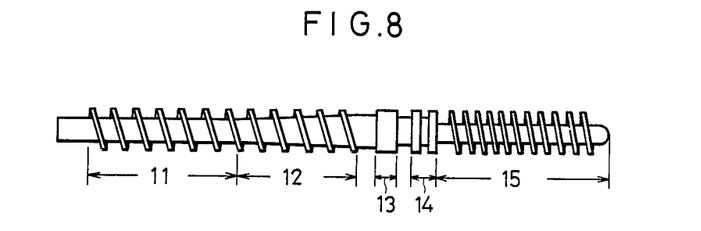
FIG. 8 is a side view showing an example of modification of the screw for molding thermoplastic resin.

FIG. 8 shows a further different example. This example is obtained by combining the main component portions in the first and the second aspects of the invention.

More specifically, the mixing section 14 is provided on the shearing section 13 in the direction of the resin extrusion side, and the relationship between the pitch in the stress relaxing section 15 and the pitch in the main portion of the screw as a whole is determined within the aforesaid range.

According to the example of arrangement shown in FIG. 8, there may be added an effect of further facilitating satisfactory kneading.

The present invention will hereunder be described further in detail with reference to more specific examples 6 and 8. Used resins are common between the examples 6 and 7, i.e. Idemitsu polypropylene, F700N, MI (Melt Index) 7 g10 min, manufactured by Idemitsu Petrochemical Co., Ltd.

EXAMPLE 6

In association with the example of the second aspect of the invention as shown in FIG. 6, an extrusion machine assembled therein with a screw having the following specification of various sections.

The general form—L/D=26; D=50 mm
The feed section—Length: 450 mm; depth of screw channel 8 mm and constant; pitch 50 mm
The compression section—Length: 400 mm, depth of screw channel: 8→4 mm (progressively decreased), pitch: 50 mm
The shearing section—Length: 25 mm; a torpedo spaced 1 mm apart from the inner wall of the cylinder
The stress relaxing section—Length: 400 mm, depth of screw channel: 4 mm; pitch: 30 mm
The resin was extruded by use of an extrusion machine with the above-described arrangement under the conditions of a preset temperature of 240° C. and 150 r.p.m., whereby a sheet having a thickness of 0.5 mm was obtained under water cooling. The sheet thus obtained was smooth on the surface thereof and excellent in transparence.

EXAMPLE 7

In addition to the provision of the mixing section on the shearing section on the resin extrusion side, the screw similar to the one shown in example 6 and the extrusion was performed in accordance with the conditions shown in example 6, whereby a sheet was obtained. In the mixing section, three gear wheels each having a length (length in the axial direction of the screw) of 18 mm and 15 crests are arranged, being spaced a predetermined distance (14 mm) apart from one another. The distance between the top of tooth and the inner wall of the cylinder is 1 mm. As a result, the sheet thus obtained is further excellent in both the surface smoothness and the transparence as compared with the case of example 6.

EXAMPLE 8

Polypropylene homopolymer (density: 0.91 g/cm$^3$, MI, 2.0 g/10 min, melting point 170° C.; manufactured by Idemitsu Petrochemical Co., Ltd.; Trade name: Idemitsu polypro F200S) was extrusion molded by an extrusion equipment using the following screw for extrusion molding and produced a polypropylene sheet under water cooling.

The extrusion molding machine—Diameter 65 mm L/D—28
Screw—(Diameter: 65 mm; pitch 65 mm) (FIG. 3)
  The feed section—Length: 650 mm Depth of screw channel: 9 mm
  The compression section—Length: 520 mm, depth of screw channel: 9→4 mm
  The shearing section (torpedo) Length 20 mm Clearance: 1 mm
  The mixing section (gear wheel of 15 crests) Length: 20 mm×3 Clearance: 1 mm
  The stress relaxing section—Length: 460 mm Depth of screw channel: 4 mm
  Die—Width: 400 mm Lip opening: 2 mm Lip heater heating die
  Molding conditions—Resin temperature: 240° C. Die lip temperature: 280° C.

Figure 9:
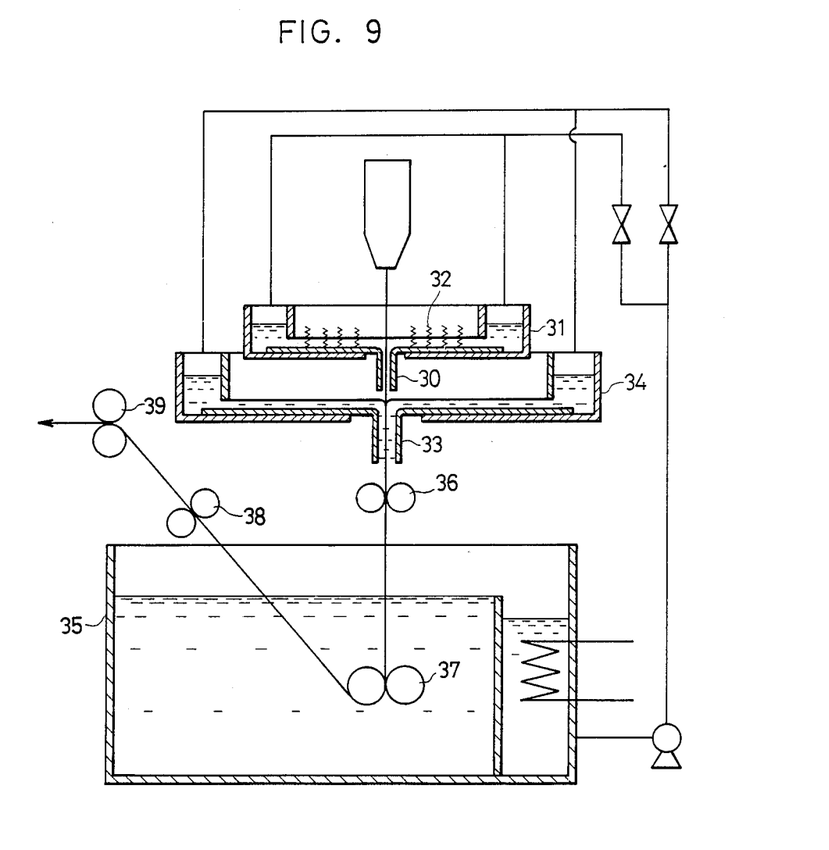
FIG. 9 illustrates a two stage type slit water colling apparatus.
Figure 10:
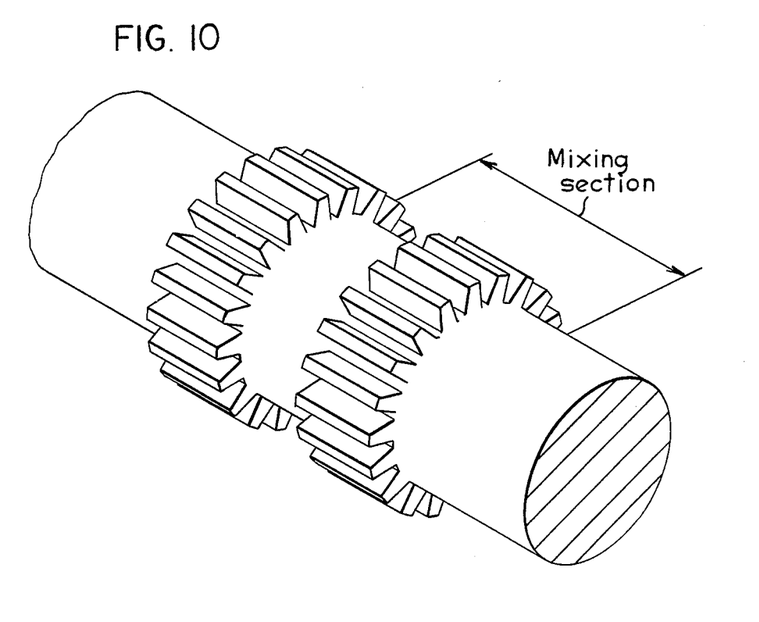
FIG. 10 illustrates gear wheels.

A transparent molten resin film-shaped member was extruded by use of the aforesaid extrusion molding equipment and under the molding conditions. Subsequently, the transparent molten resin film-shaped member was introduced into a two-stage type slit water cooling apparatus as shown in FIG. 9 (Japanese Patent Laid-Open (Kokai) No. 203018/1983; height of the first stage slit 30: 50 mm; width thereof: 2.5 mm; water level of the slit top water tank 31: 5 mm; water temperature: 5° C.; four stage rectifier member 32 each having doubly folded 60 mesh wire screens being used; height of the second stage slit 33: 10 mm; width thereof: 5 mm; water level of the slit top water tank 34: 10 mm; water temperature 5° C.), where the film-shaped member was quickly cooled, and was molded by rollers 36 to 38 at a takeup speed 16 m/min, whereby a polypropylene sheet having a thickness of 0.23 mm was obtained. Further, this sheet was heat-treated by use of rolls heated to 130° C. The physical properties of the sheet are as follows:

Total haze*$^1$—2.4%
Outer haze*$^1$—1.9%
Surface luster*$^2$—128%
Tensile strength(MD/TD)*$^3$ 600/500(Kg/cm$^2$)
Tensile modulus (MD/TD)*$^3$ 19000/19000 Kg/cm$^2$

*1—ASTM D 1003
*2—ASTM D 523
*3—JIS K 6301

As apparent from the example 8, products, in which the surface is uniform and the luster is excellent, was obtained.

As described above, the present invention have the effect of providing a construction of the screw, wherein satisfactory kneading properties and high molding stability, which would have otherwise been difficult to be compatible, are made compatible.

What is claimed is:

1. A screw for molding thermoplastic resin, comprising: a feed section, a compression section which is a relaxed compression section having a compression ratio in the range of 3 or less, a shearing section and a stress relaxation section being successively provided from a resin feed side to a resin extrusion side, and a mixing section being provided intermediate said shearing section and said stress relaxation section, the length of said shearing section being in the range of 0.2-2 times the diameter of said screw, the length of said stress relaxation section being in the range of 4-15 times the diameter of said screw, and a ratio L/D between the total length L and the diameter D of said screw being in the range of 15-40.

2. A screw for molding thermoplastic resin as set forth in claim 1, wherein said feed section is a straight screw having a compression ratio of 1.

3. A screw for molding thermoplastic resin as set forth in claim 1, wherein said compression ratio is in the range of 2.5 or less.

4. A screw for molding thermoplastic resin as set forth in claim 1, wherein said shearing section is a torpedo.

5. A screw for molding thermoplastic resin as set forth in claim 1, wherein the length of said shearing section is in the range of 0.3-1.5 times the diameter of said screw.

6. A screw for molding thermoplastic resin as set forth in claim 1, wherein said mixing section is contiguous with said shearing section on said resin extrusion side.

7. A screw for molding thermoplastic resin as set forth in claim 1, wherein said mixing section comprises gear wheels.

8. A screw for molding thermoplastic resin as set forth in claim 7, wherein said plurality of said gear wheels are spaced a predetermined distance apart from one another, and the outer diameter of said gear wheels is equal to the outer diameter of said shearing section.

9. A screw for molding thermoplastic resin as set forth in claim 1, wherein mixing sections are provided at opposite axial ends of said shearing section.

10. A screw for molding thermoplastic resin as set forth in claim 9, wherein said mixing sections each comprise gear wheels.

11. A screw for molding thermoplastic resin, comprising: a feed section, a compression section, a shearing section and a stress relaxation section are successively provided from a resin feed side to a resin extrusion side, said screw having at least one thread in each of said sections, the pitch of at least part of said thread in said stress relaxation section being in the range of 0.3-0.8 times the pitch of the thread in at least one of said feed section and said compression section, and a ratio L/D between the total length L and the diameter D of said screw is in the range of 15-40.

12. A screw for molding thermoplastic resin as set forth in claim 11, wherein said stress relaxation section has a compression ratio in the range of 2-0.5.

13. A screw for molding thermoplastic resin as set forth in claim 11, wherein said stress relaxation section has a compression ratio in the range of 1.6-0.8.

14. A screw for molding thermoplastic resin as set forth in claim 11, wherein a mixing section is contiguous with said shearing section on said resin extrusion side.

15. A screw for molding thermoplastic resin as set forth in claim 11, wherein a mixing section is contiguous with said shearing section on said resin feed side.

16. A screw for molding thermoplastic resin as set forth in claim 11, wherein mixing sections are provided at opposite axial ends of said shearing section on both the resin extrusion and the resin feed sides, respectively.

17. A screw for molding thermoplastic resin as set forth in claim 16, wherein said mixing section comprises gear wheels.

* * * * *